I. SMITH.
Chuck.
No. 56,329.
Patented July 10, 1866.
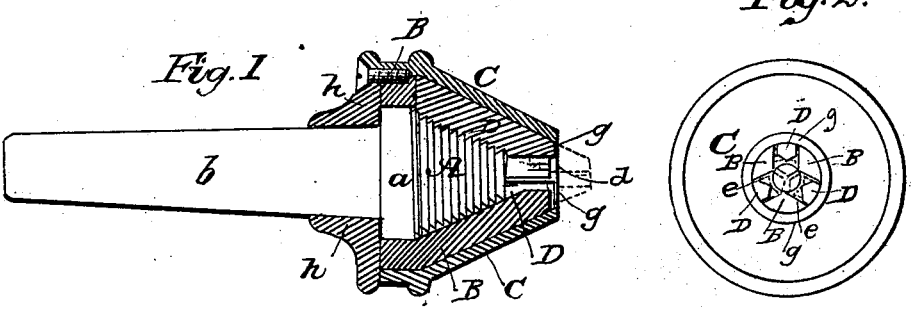

UNITED STATES PATENT OFFICE.

ISAAC SMITH, OF NEW YORK, N. Y., ASSIGNOR TO HIMSELF AND W. H. HAIGHT, OF SAME PLACE.

IMPROVEMENT IN CHUCKS.

Specification forming part of Letters Patent No. 56,329, dated July 10, 1866.

*To all whom it may concern:*

Be it known that I, ISAAC SMITH, of the city, county, and State of New York, have invented a new and useful Improvement in Chucks; and I do hereby declare that the following is a full, clear, and exact description of the same, reference being had to the accompanying drawings, making a part of this specification, in which—

Figure 1 is a partial longitudinal section of a chuck constructed according to my invention. Fig. 2 is an end view of the same.

Similar letters of reference indicate corresponding parts in both figures.

This invention relates to that class of chucks which are employed for concentrically holding drills for drilling metal and other substances, and for holding wire during the operation of turning the same; and it consists in a conical screw and sliding griping-jaws so arranged with reference to each other and with the conical body of the chuck and a conical case fitted upon the said body that the chuck may be readily adjusted to properly hold wire or drills of any required size.

To enable others to understand the construction and operation of my invention, I will proceed to describe it with reference to the drawings.

A is a conical screw, having a flange, $a$, formed upon its rearmost end, and which is situated upon the end of a shank, $b$. This shank $b$, together with the screw A, may be made tubular throughout, in order to enable the chuck to hold pieces of wire of any desired length.

B is the hollow body of the chuck, which is placed upon the conical screw A. Its flange $a$ and its rearmost part, which surrounds the flange $a$, are made of a form to correspond therewith; but the forward and larger portion of this body B is of conical shape, with its inner and outer surfaces corresponding to the conical form of the said screw A, as clearly represented in Fig. 1. This body B has an opening in its forward end, as shown at $d$ in Fig. 1.

Formed in the forward or conical part of the body B are three longitudinal slots, $e$, which extend from the opening $d$ back to that part of the said body which surrounds the flange $a$ of the screw A. In each of these slots $e$ is placed a sliding griping-jaw, D, the inner side of which forms a longitudinal section of a female screw, which meshes into the conical screw A.

C is a conical case, which is fitted upon the body A, and has an opening, $g\ g$, in its forward end. A collar, $h$, is placed upon the forward part of the shank $b$, immediately behind the flange $a$ of the conical screw A and the rearmost end of the case C, and is firmly secured to the rearmost end of the body B and the case C by suitable screws $i$, so that the collar $h$, the body B, and the case C are rigidly held together, thus securely retaining the conical screw A in its place within the body B and keeping the sliding griping-jaws D in proper contact with the conical screw A.

By turning the body B with its attached case C and collar $h$ in one direction the conical screw A acts upon the threads formed upon the inner sides of the sliding griping-jaws D and moves the said jaws D forward, so that their forward ends project out through the openings $d$ and $g\ g$, the internal inclined sides of the conical case C causing their forward ends to approach each other as they move forward until they meet in the position shown in red lines in the drawings, and to keep them in contact with the screw A; while by turning the said body in the opposite direction the griping-jaws D are caused to move back in the case and to recede from each other until they reach the position represented in Fig. 1. By thus turning the body of the chuck in one direction or the other the jaws D may be brought to any intermediate position to concentrically grasp and hold a wire or drill of any desired size.

The shank $b$ is, of course, placed in the mandrel of a suitable lathe, and by making the said mandrel hollow a piece of wire may be passed through it and through the shank $b$ and conical screw A, so that the wire may be of any required length and yet be firmly held in the chuck to have a screw formed upon it or to be turned for other purposes.

The conical screw, instead of being formed upon the exterior of the shank $b$, may be formed inside of the shell C, in which case the backs or exterior surfaces of the jaws D D would be threaded, and the inner surfaces of the said dogs would be plain, and a plain cone substituted for the conical screw A.

What I claim as new, and desire to secure by Letters Patent, is—

The conical screw and sliding threaded gripping-jaws D, arranged with reference to each other and with the conical body B and case C, substantially as herein set forth, for the purpose specified.

ISAAC SMITH.

Witnesses:
J. W. COOMBS,
A. LE CLERC.